United States Patent Office 3,098,030
Patented July 16, 1963

3,098,030
CATALYTIC HYDROCRACKING WITH A
PLATINUM COMPOSITE CATALYST
Harry L. Coonradt, Woodbury, Wilbur K. Leaman, Medford Lakes, and Joseph N. Miale, Runnemede, N.J., assignors to Socony Mobil Oil Company, Inc., a corporation of New York
No Drawing. Filed June 24, 1960, Ser. No. 38,444
10 Claims. (Cl. 208—111)

This invention relates to an improved catalytic hydrocracking process. More particularly, the present invention is directed to a process wherein a high boiling petroleum hydrocarbon or hydrocarbon mixture is subjected to cracking in the presence of hydrogen and a catalyst consisting essentially of a physical particle-form mixture of (1) a hydrogenation component other than a platinum metal intimately combined with an acidic component of two or more refractory oxides of the elements of groups IIA, IIIB, IVA and IVB of the periodic table, characterized by an activity index, as defined herein, of at least 25 and (2) a platinum metal deposited on an essentially inert porous support having an activity index of less than 20. The invention is further directed to the aforesaid catalyst.

It has heretofore been proposed to effect hydrocracking in the presence of a catalyst consisting essentially of an acidic cracking component such as cogelled or coprecipitated composites, or composites prepared by deposition of one or more of the oxides on another, of silica-alumina, silica-zirconia, silica-alumina-zirconia, silica-alumina-thoria and the like, which acidic component has deposited thereon a minor proportion of a platinum metal, Such proposed catalysts have been found, in general, to possess good activity and selectivity for use in hydroprocessing operations. However, upon regeneration to remove coke by burning the same in an oxygen-containing atmosphere, the siliceous platinum metal catalysts above described were found to have reduced activity and selectivity. The observed decline in these properties has commonly been attributed to agglomeration of the platinum metal.

It has also heretofore been known to carry out hydrocracking in the presence of various types of non-platinum catalysts including, by way of example, nickel tungsten sulfides deposited on siliceous supports, molybdena on silica-alumina, tungsten sulfide deposited on acid activated clays and iron deposited on silica-alumina composites. Such type catalysts have, in general, however not possessed the activity and selectivity in hydrocracking operations characterizing the aforementioned platinum metal-containing catalysts.

It is accordingly a principal object of the present invention to provide an improved hydrocracking catalyst suitable for commercial operation having the desirable attributes of high activity, high selectivity and good regenerability when employed in the hydrocracking of selected petroleum fractions, thereby affording an overall improved and commercially attractive hydrocracking process.

The above and other objects which will be apparent to those skilled in the art are realized in accordance with this invention. In one embodiment, the present invention relates to a process for hydrocracking a hydrocarbon charge by contacting the same under hydrocracking conditions with a catalyst consisting essentially of a physical particle-form mixture of (1) a hydrogenation component, other than a platinum metal, intimately combined with an acidic component of two or more refractory oxides of the elements of groups IIA, IIIB, IVA and IVB of the periodic table, having an activity index of at least 25 and (2) a platinum metal deposited on an essentially inert support having an activity index of less than 20. In another embodiment, the invention provides an effective hydrocracking catalyst of the above composition.

In accordance with the present invention, it has been discovered that cracking of hydrocarbons in the presence of hydrogen and a particular catalyst gives rise to an improved and enhanced yield of premium products. Thus, it has been found that hydrocracking of hydrocarbons may be carried out with improved results in the presence of a catalyst consisting essentially of a hydrogenation component such as the oxides and sulfides of a group VIA metal and combinations thereof with a metal selected from iron, nickel, cobalt and oxides and sulfides thereof intimately combined with an acidic component of two or more refractory oxides of the elements of groups IIA, IIIB, IVA and IVB of the periodic table having an activity index of at least 25, which composite is supplemented by physical admixture therewith of another component consisting essentially of a metal of the platinum series, i.e. platinum, palladium, rhodium, osmium, iridium, and ruthenium deposited on a porous inert support characterized by an activity index of less than 20.

In general, the present invention affords a hydrocracking catalyst consisting essentially of a physical particle-form mixture of (1) a minor proportion of a hydrogenation component other than a platinum metal intimately combined with a major proportion of an acidic component of two or more refractory oxides of the elements of groups IIA, IIIB, IVA and IVB of the periodic table having an activity index of at least 25 and (2) a porous inert support characterized by an activity index of less than 20 and having deposited thereon between about 0.05 and about 10 percent by weight of a platinum metal and constituting between about .1 and about .9 weight fraction of said mixture.

The present invention also provides a process for hydrocracking hydrocarbons and particularly petroleum hydrocarbon fractions having an initial boiling point of at least about 400° F., a 50 percent point of at least about 500° F. and an end boiling point of at least about 600° F. by contacting said fractions with the above catalyst in the presence of hydrogen at a pressure between about 100 and about 5000 pounds per square inch gauge, at a liquid hourly space velocity of between about 0.1 and about 10, at a temperature between about 400° F. and 950° F., employing a molar ratio of hydrogen to hydrocarbon charge of between about 2 and about 80.

It has heretofore been proposed to convert hydrocarbon fractions to products of increased octane number by subjecting them to reforming operations. These operations employ hydrogen and catalysts which, in some cases, comprise a platinum metal component. The hydrocracking process described herein is distinct from the reforming processes of the prior art that involved use of a platinum metal-containing catalyst. Thus, there are at least four differences between the hydrocracking process of this invention and the aforesaid reforming operations. First of all, it is to be noted that the processes are carried out for two different purposes. Cracking is used to convert high boiling hydrocarbon fractions into low boiling hydrocarbon fractions while reforming is carried out for the purpose of increasing the octane number of low boiling hydrocarbon fractions with little or no cracking. Secondly, the charge stocks employed in cracking and in reforming are not the same. A reforming charge stock, i.e. a naphtha, ordinarily has an initial boiling point well below about 400° F. and usually as low as 125° F. to 200° F. Regardless of the initial boiling point, however, the reforming charge stocks have 50 percent points well below 500° F. and end boiling points far below 600° F.

Cracking charge stocks employed in the instant process, on the other hand, have initial boiling points of at least about 400° F.; 50 percent points of at least about 500° F. and end boiling points of at least about 600° F. A third difference relates to the chemical reactions involved in the process. In reforming, it is desired to produce gasolines having substantially aromatic hydrocarbon contents from highly aliphatic reforming charge stocks. Accordingly, reforming involves aromatization reactions resulting in the production of large amounts of hydrogen during the reforming operation. Cracking, on the other hand, does not involve these aromatization reactions since the purpose of cracking is to convert high boiling hydrocarbons by selective breakage of carbon to carbon bonds. In contrast to reforming, such operation consumes hydrogen. A still further distinction resides in the fact that the cracking process of this invention is obtainable at temperatures that are lower than the temperature at which reforming processes are obtainable. It will, accordingly, be appreciated that the aforementioned reforming processes of the prior art and the cracking process of this invention are clearly distinct.

The conventional cracking activity of catalyst is generally expressed in terms of the percent by volume of a standard hydrocarbon charge which is cracked under specific conditions in the Cat-A test. The method of this test is described in National Petroleum News, 36, page PR 537 (August 2, 1944) and the cracking activity so determined is referred to as the "Activity Index" (A.I.). Accordingly, it will be understood that the term "activity index" when employed herein shall refer to the cracking activity of the material under consideration determined in accordance with the Cat-A method.

The physical particle-form mixture comprising the present catalyst allows a wide choice for the carriers supporting the platinum metal component. Thus, it is contemplated that the carrier employed herein may be any porous inert material which is not adversely affected by the temperature conditions of the instant process. The carrier desirably has a surface area greater than about 10 square meters per gram and preferably in excess of 30 square meters per grams and may extend up to 500 square meters per gram or more to achieve efficient surface spreading of the platinum metal. The term "surface area" as used herein designates the surface area of the carrier as determined by the adsorption of nitrogen according to the method of Brunnauer et al., Journal American Chemical Society, 60, 309 et seq. (1938). The carrier or support is essentially inert, that is it is devoid of or exerts relatively little catalytic activity under the reaction conditions at which the present process is carried out. The activity index of the support for the platinum metal component utilized herein is essentially less than 20 and usually is within the range of 5 to 20. Suitable supports include single oxides of the metals of group IIA, IIIB, IVA and IVB of the periodic table. Non-limiting examples include alumina, zirconia, titania, silica, magnesia, etc. Other suitable inert materials include charcoal, kieselguhr, porous glass, porcelain, pumice, coke, activated carbon, bauxite, etc. The density of the carrier employed, i.e., the bulk density thereof will usually be within the range of .2 to 2.0 grams/cc. and more particularly between about .4 and about 1.2 grams/cc. An advantage of the present catalyst is that the platinum metal can be placed upon a selected support which minimizes loss of platinum activity during regeneration and thus provides a catalyst of long effective life. In this regard, it has been found that the platinum metal is preferably deposited on an alumina carrier or support.

The porous inert carrier serves as a support for a catalytically effective amount of a platinum metal, i.e. platinum, palladium, rhodium, osmium, iridium, and ruthenium as well as alloys or mixtures of these metals. Of the foregoing platinum and palladium, and in particular platinum, are accorded preference. The amount of the platinum metal contained in the present catalyst is generally between about 0.05 and about 10 percent by weight of the carrier and, more particularly, between about 0.1 and about 5 percent by weight of the carrier.

In accordance with the present invention, the weight fraction of inert support having platinum metal deposited thereon may vary widely, thereby affording desirable flexibility in the catalyst composition, which may be varied with the specific charge stock undergoing treatment and with the particular reaction conditions under which the hydrocracking operation is effected. In general, however, the weight fraction of the carrier supporting the platinum metal component of the present catalyst is between about .1 and about .9.

The hydrogenation component, other than a platinum metal, which is contained in the instant catalyst and which is intimately combined with an acidic component of two or more refractory oxides may, in accordance with the present invention, vary widely. Typical hydrogenation components include the oxides and sulfides of a group VIA metal and combinations thereof with a metal selected from iron, nickel, cobalt and oxides and sulfides thereof. Thus, representative hydrogenation components are molybdenum oxide, tungsten sulfide, molybdenum sulfide, cobalt molybdate, iron, nickel, cobalt sulfide, nickel molybdate, etc. Such component is intimately combined with an acidic component composed of two or more refractory oxides such as for example silica-alumina, silica-zirconia, silica-alumina-zirconia, silica-alumina-thoria, silica-magnesia, silica-alumina-magnesia, alumina-boria and the like. The above composites may be naturally occurring in the form of minerals and clays, or as is generally the case will be synthetically prepared. The preferred acidic component is a synthetic composite of silica and alumina containing from about 3 percent up to about 40 percent by weight of alumina. The activity index of the acidic component is at least 25 and preferably is within the range of 25 to 75. The above hydrogenation component and acidic component are intimately combined, for example, by depositing the hydrogenation component on the acidic component, by ball milling the two components together or by coprecipitating or cogelling such components. The relative amounts of hydrogenation and acidic components so combined may vary widely depending on the specific components used, as well as on the nature of the platinum metal component and the charge stock undergoing hydrocracking. Generally, however, the amount of the hydrogenation component will constitute between about 1 and about 30 percent by weight of the composite of hydrogenation and acidic components.

The particle size of the components, i.e. the platinum metal-containing component and the hydrogenation-acidic oxide component may be very small, i.e, less than about 50 microns, resulting for example, from co-ballmilling the components together. In a preferred embodiment of the invention, however, the particles of each of the two components will be sufficiently large as to permit ready separation thereof by mechanical means which, in turn, makes possible separate types of regeneration, reactivation, and replacement of the two components. Also, with the use of relatively larger size particles, as contrasted with finely divided particles of less than 100 microns in diameter, interaction of the two components, with resultant acceleration of platinum agglomeration, can be minimized. Accordingly, the particle size of the two components making up the present catalyst will generally be within the approximate range of 2 to 50 mesh (Tyler).

The platinum metal may be deposited on the inert support in any suitable manner. One feasible method is to admix particles of the carrier with an aqueous solution of an acid of the metal, for example, chloroplatinic acid of suitable concentration. A preferred method of introducing platinum is to contact the support with a solution of chloroplatinic acid while stirring and to thereafter pass hydrogen sulfide gas through the slurry with continued stirring forming platinum sulfide. While platinum is preferably combined with the support as a solution of chloroplatinic acid, other suitable platinum compounds may be employed including solutions or suspensions of platinum cyanide, platinum sulfide, platinum hydroxide or platinum oxide. In cases where the solution of platinum metal compound is not soluble in water, other suitable solvents such as alcohols, ethers, etc. may be used. In addition to platinum, other metals of the platinum family such as palladium may be combined with the support in a similar manner, using, for example, palladium chloride as the impregnating solution. The impregnated particles are then dried and treated with hydrogen at elevated temperatures to reduce the chloride to the metal or are calcined in air or other media at elevated temperatures.

The hydrogenation-acidic oxide component may be prepared in any suitable manner well known in the art, for example, by depositing the hydrogenation component on the acidic oxide component or by intimately admixing the two components for example, by ballmilling. Thus, taking as an example molybdenum oxide on silica-alumina, such composite may be readily prepared by initially forming the silica-alumina gel and contacting the same with a suitable molybdenum compound, for example molybdic acid to deposit an effective amount of molybdenum compound on the gel and subsequently remove the impregnated gel from contact with the solution and drying and calcining the same. The acidic component may be produced by any of the usual methods well known in the art employing, for example, cogellation or impregnation techniques. Thus, taking the preparation of silica-alumina composites as a typical example, cogels of silica and alumina may be prepared by intimately admixing an acidic solution of aluminum salt with sodium silicate to yield a silica-alumina hydrosol which sets, after lapse of a suitable period of time to a hydrogel. The resulting hydrogel is thereafter water-washed, base-exchanged to remove zeolitic sodium, dried in superheated steam and finally calcined at 900° F. to 1400° F. in air. Alternatively, a silica-alumina composite may be produced by separately forming a hydrogel or gelatinous precipitate of silica and a hydrogel or gelatinous precipitate of alumina and ballmilling or otherwise intimately admixing the silica and alumina together to yield a resulting silica-alumina composite. In such instances, the silica is suitably prepared by mixing an acid solution, for example aqueous sulfuric acid solution with sodium silicate. If it is desired to prepare silica initially free of alkali metal ions, such may be accomplished by effecting hydrolysis of alkali silicates, i.e. ethyl silicate. Alumina is readily prepared by the addition of ammonium or alkali metal hydroxide to an aqueous aluminum salt solution, for example an aluminum salt of a mineral acid such as aluminum nitrate, aluminum chloride and aluminum sulfate. As another alternate procedure for preparing the silica-alumina composite, a synthetic silica gel or precipitate may be prepared in accordance with one of the foregoing processes and alumina may be deposited thereon by contacting the silica gel or precipitate with an aqueous aluminum salt solution followed by the addition of a sufficient amount of ammonium hydroxide to effect precipitation of alumina on the silica. The composite of silica and alumina can further be prepared by contacting preformed silica gel with an aqueous aluminum salt solution thereafter removing the impregnated silica gel from the solution and heating to a sufficiently elevated temperature to decompose the aluminum salt laid down by impregnation to alumina so that the resulting product is silica impregnated with the requisite amount of alumina. All of the foregoing methods for preparing composites of alumina and silica are well known in the art and are referred to herein merely as exemplary of suitable preparation procedures. It will be realized that composites of other oxides than silica and alumina and composites of more than two oxides may, with suitable modification, likewise be prepared in accordance with the general procedure above outlined.

The catalyst of this invention is prepared by mixing the platinum metal-containing component and the hydrogen-acidic oxide component in the form of discrete particles preferably having the particle size diameter indicated hereinabove or the components may be admixed and pelleted, cast, molded or otherwise formed into pieces of desired size and shape such as rods, spheres, pellets, or other desired configuration.

Hydrocracking, in accordance with the present process, is generally carried out at a temperature between about 400° F. and about 950° F. The hydrogen pressure in such operation is generally within the range of about 100 to about 5000 pounds per square inch gauge and preferably between about 350 and about 2000 pounds per square inch gauge. The liquid hourly space velocity, i.e. the liquid volume of hydrocarbon per hour per volume of catalyst is between about 0.1 and about 10. In general, the molar ratio of hydrogen to hydrocarbon charge employed is between about 2 and about 80 and preferably between about 5 and about 50.

Hydrocarbon charge stocks undergoing cracking in accordance with this invention comprise hydrocarbons, mixtures of hydrocarbons and, particularly, hydrocarbon fractions having an initial boiling point of at least about 400° F., a 50 percent point of at least about 500° F. and an end point of at least about 600° F. Such hydrocarbon fractions include gas, oils, residual oils, cycle stocks, whole topped crudes and heavy hydrocarbon fractions derived by the destructive hydrogenation of coal, tars, pitches, asphalts and the like. As will be recognized, the distillation of higher boiling petroleum fractions must be carried out under vacuum in order to avoid thermal cracking. The boiling temperature utilized herein, however, are expressed for convenience in terms of the boiling point corrected to atmospheric pressure.

The process of this invention may be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed with the catalyst described herein.

The catalyst, after use in hydrocracking for a period of time such that its activity is detrimentally affected, is subjected to regeneration. For such purpose, the spent catalyst is contacted with an oxygen-containing atmosphere at an elevated temperature sufficient to burn carbonaceous deposits from the catalyst. Regeneration conditions for the hydrocracking catalyst described herein include a temperature between about 600 and about 1000° F., a pressure from atmospheric to 2000 pounds per square inch and an oxygen concentration from 0.1 percent to 100 percent. Oxygen may be diluted with nitrogen or other inert gas. Careful control of the rate of burning and temperature during regeneration is necessary in order not to impair the catalytic activity of the platinum metal component. Higher temperatures during regeneration, i.e., exceeding about 1000° F. are generally undesirable since such are considered harmful to platinum metal catalysts.

The following examples will serve to illustrate the process and catalyst of the invention without limiting the same:

EXAMPLE 1

A composite of molybdena, silica and alumina was prepared by impregnating a cogel of silica and alumina containing about 10 weight percent alumina and 90 weight percent silica and having a surface area of 415 square meters per gram with molybdena. Impregnation was accomplished by contacting 160 grams of the silica-alumina gel in the form of 14–25 mesh (Tyler) size particles after evacuation with 85 cc. of an oxalic acid solution containing 17.8 grams of molybdenum oxide and 16.5 grams of oxalic acid dihydrate. The resultant product was maintained at 230° F. for 16 hours and then heated for 16 hours at 1000° F. in air. The composite so obtained had a molybdena content of 10.2 percent by weight and possessed a surface area of 294 m.²/gram and a bulk density of 0.71 gram/cc.

A composite of platinum on alumina employed was a commercially available catalyst of the type used for catalytic reforming of naphthas and contained 0.59 weight percent platinum and 0.71 weight percent chlorine. It had a surface area of 425 m.²/gram and was in the form of particles 1/16 inch in diameter and approximately 3/16 inch in length.

The two above components were mixed in the following proportions:

| | Parts by weight |
|---|---|
| Molybdena-silica-alumina | 57 |
| Platinum on alumina | 43 |

Admixture was carried out by rotating the particles in a container under conditions such that the particle size of each of the components was not appreciably changed.

EXAMPLE 2

The two components in the same proportion used in Example 1 were co-ballmilled dry for 50 hours. The resulting mixture was then pelleted and the pellets crushed and screened to give 14–25 mesh (Tyler) particles. The resulting catalyst contained 0.28 weight percent platinum.

The above catalysts, as well as each of the components thereof, were tested for hydrocracking activity utilizing a heavy gas oil as the charge stock. Such charge comprised material boiling continuously between about 650° F. and a residual fraction of 10.6 volume percent of crude and was further characterized by the following properties:

| | |
|---|---|
| Gravity, API | 26.8 |
| Vacuum Assay, °F.: | |
| 5% | 682 |
| 50% | 781 |
| 95% | 885 |
| Sulfur, weight percent | 0.79 |
| Nitrogen, weight percent | 0.08 |
| Aniline No. °F. | 184.5 |

The reaction conditions employed included a pressure of 1500 p.s.i.g., a liquid hourly space velocity of 0.5, hydrogen in the amount of 14,500 standard cubic feet per barrel and temperatures designated in Table I hereinbelow. The products obtained with each of the foregoing catalysts are shown below in such table on a no-loss basis, i.e. distributing all loss or gain proportionally by weight over all products.

It will be seen from the foregoing data that platinum-alumina was a very poor hydrocracking catalyst having a low activity and affording poor yields of liquid products. Molybdena-silica-alumina while much more effective as a hydrocracking catalyst still possessed only a moderate selectivity. The supplementing of molybdena-silica-alumina with platinum-alumina, as will be noted, produced a catalyst that afforded higher yields of premium products ($C_5^+$ Product) than either of the two components alone. In addition, the hydrogen consumption was lower with the supplemented catalyst than with the molybdena-silica-alumina component in the absence of the supplementing platinum-alumina component.

It will be understood that the above description is merely illustrative of preferred embodiments of the invention of which many variations may be made within the scope of the following claims by those skilled in the art without departing from the spirit thereof.

We claim:

1. A process for hydrocracking hydrocarbon fractions which comprises contacting a hydrocarbon fraction having an initial boiling point of at least about 400° F., a 50 percent point of at least about 500° F. and an end boiling point of at least about 600° F. with a catalyst consisting essentially of a physical particle-forming mixture of (1) molybdenum oxide, intimately combined in an amount of between about 1 and about 30 percent by weight of the resulting composite with an acidic component of two or more refractory oxides of the elements of groups IIA, IIIB, IVA and IVB of the periodic table, which acidic component has an activity index of at least 25 and (2) an inert support characterized by an activity index of less than 20 and having deposited thereon between about 0.05 and about 10 percent by weight of platinum metal and constituting between about .1 and about .9 weight fraction of said mixture, said contacting taking place at a temperature between about 400° F. and about 950° F., a liquid hourly space velocity of between about 0.1 and about 10 in the presence of hydrogen and with a net consumption of hydrogen under a pressure of between about 100 and about 5000 p.s.i.g. employing a molar ratio of hydrogen to hydrocarbon charge between about 2 and about 80.

2. A process for hydrocracking hydrocarbon fractions which comprises contacting in the presence of hydrogen, under hydrocracking conditions, a hydrocarbon fraction having an initial boiling point of at least about 400° F., a 50 percent point of at least about 500° F. and an end boiling point of about 600° F. with a catalyst consisting essentially of a physical particle-form mixture of (1) molybdenum oxide intimately combined in an amount of between about 1 and about 30 percent by weight of the resulting composite with an acidic component of two or more refractory oxides of the elements of groups IIA, IIIB, IVA and IVB of the periodic table which acidic Table I

| Catalyst Description | $MoO_3/SiO_2/Al_2O_3$ $+Pt/Al_2O_3$ (Example 1) | $MoO_3/SiO_2/Al_2O_3$ $+Pt/Al_2O_3$ (Example 2) | $Pt/Al_2O_3$ | $MoO_3/SiO_2/Al_2O_3$ |
|---|---|---|---|---|
| Conversion, 390° F.[a] | 44.7 | 45.5 | 56.6 | 46.7 |
| Conversion, 650° F.[b] | 86.4 | 80.2 | 95.7 | 85.2 |
| Temperature, °F. | 814 | 822 | 917 | 802 |
| Dry Gas,[c] Wt. Percent | 2.8 | 3.4 | 10.4 | 4.2 |
| Butanes, Vol. Percent | 6.0 | 8.1 | 12.3 | 9.4 |
| Light Naphtha,[d] Vol. Percent | 12.7 | 14.8 | 16.1 | 14.3 |
| Heavy Naphtha,[e] Vol. Percent | 38.3 | 34.7 | 35.2 | 34.9 |
| Light Fuel Oil,[f] Vol. Percent | 41.7 | 34.7 | 39.1 | 38.5 |
| 650° F.+Product, Vol. Percent | 13.6 | 19.8 | 4.3 | 14.8 |
| $C_5^+$ Product, Vol. Percent | 106.3 | 104.0 | 94.7 | 102.5 |
| Hydrogen Consumption, s.c.f./b. | 1,010 | 1,060 | ---------- | 1,170 |

[a] 100 minus volume percent of product based on charge boiling above 390° F.
[b] 100 minus volume percent of product based on charge boiling above 650° F.
[c] Hydrocarbons of 1 through 3 carbon atoms only, does not include hydrogen sulfide or ammonia.
[d] Pentanes and higher boiling products.
[e] Product boiling from 170–390° F.
[f] Product boiling from 390° F. to 650° F. (based on ASTM distillation).

component has an activity index of at least 25 and (2) a porous support characterized by an activity index of less than 20 and having deposited thereon between about 0.05 and about 10 percent by weight of platinum metal and constituting between about .1 and about .9 weight fraction of said mixture.

3. A process for hydrocracking a hydrocarbon charge which comprises contacting the same in the presence of hydrogen under hydrocracking conditions with a catalyst consisting essentially of a physical particle-form mixture of (1) molybdenum oxide intimately combined in an amount of between about 1 and about 30 percent by weight of the resulting composite with an acidic component of two or more refractory oxides of the elements of groups IIA, IIIB, IVA and IVB of the periodic table which acidic component has an activity index of at least 25 and (2) an inert support characterized by an activity index of less than 20 and having deposited thereon between about 0.05 and about 10 percent by weight of platinum metal and constituting between about .1 and about .9 weight fraction of said mixture.

4. A process for hydrocracking a hydrocarbon charge which comprises contacting the same in the presence of hydrogen under hydrocracking conditions with a catalyst consisting essentially of a physical particle-form mixture of (1) molybdenum oxide intimately combined in an amount of between about 1 and about 30 percent by weight of the resulting composite with an acidic component of two or more refractory oxides of the elements of groups IIA, IIIB, IVA and IVB of the periodic table which acidic component has an activity index of at least 25 and (2) a porous alumina support having an activity index of less than 20 and having deposited thereon between about 0.05 and about 10 percent by weight of platinum and constituting between about .1 and .9 weight fraction of said mixture.

5. A process for hydrocracking a hydrocarbon charge which comprises contacting the same in the presence of hydrogen under hydrocracking conditions with a catalyst consisting essentially of a physical particle-form mixture of (1) molybdenum oxide intimately combined in an amount of between about 1 and about 30 percent by weight of the resulting composite with an acidic silica-alumina component having an activity index of at least 25 and (2) a porous alumina support having an activity index of less than 20 and having deposited thereon between about 0.05 and about 10 percent by weight of platinum and constituting between about .1 and .9 weight fraction of said mixture.

6. A process for hydrocracking a hydrocarbon charge which comprises contacting the same in the presence of hydrogen under hydrocracking conditions with a catalyst consisting essentially of a physical mixture of particles, the particle size of which is within the approximate range of 2 to 50 mesh of (1) molybdenum oxide intimately combined in an amount of between about 1 and about 30 percent by weight of the resulting composite with an acidic component of two or more refractory oxides of the elements of groups IIA, IIIB, IVA and IVB of the periodic table which acidic component has an activity index of at least 25 and (2) a porous support characterized by an activity index of less than 20 and having deposited thereon between about 0.05 and about 10 percent by weight of platinum metal and constituting between about .1 and about .9 weight fraction of said mixture.

7. A hydrocracking catalyst consisting essentially of a physical particle-form mixture of (1) molybdenum oxide intimately combined in an amount of between about 1 and about 30 percent by weight of the resulting composite with an acidic component of two or more refractory oxides of the elements of groups IIA, IIIB, IVA and IVB of the periodic table which acidic component has an activity index of at least 25 and (2) a porous support characterized by an activity index of less than 20 and having deposited thereon between about 0.05 and about 10 percent by weight of platinum metal and constituting between about .1 and about .9 weight fraction of said mixture.

8. A hydrocracking catalyst consisting essentially of a physical particle-form mixture of (1) molybdenum oxide intimately combined in an amount of between about 1 and about 30 percent by weight of the resulting composite with an acidic component of two or more refractory oxides of the elements of groups IIA, IIIB, IVA and IVB of the periodic table which acidic component has an activity index of at least 25 and (2) a porous alumina support having an activity index of less than 20 and having deposited thereon between about .05 and about 10 percent by weight of platinum and constituting between about .1 and .9 weight fraction of said mixture.

9. A hydrocracking catalyst consisting essentially of a physical particle-form mixture of (1) molybdenum oxide intimately combined in an amount of between about 1 and about 30 percent by weight of the resulting composite with an acidic silica-alumina component having an activity index of at least 25 and (2) a porous alumina support having an activity index of less than 20 and having deposited thereon between about 0.05 and about 10 percent by weight of platinum and constituting between about .1 and .9 weight fraction of said mixture.

10. A hydrocracking catalyst consisting essentially of a physical mixture of particles, the particle size of which is within the approximate range of 2 to 50 mesh of (1) molybdenum oxide intimately combined in an amount of between about 1 and about 30 percent by weight of the resulting composite with an acidic component of two or more refractory oxides of the elements of groups IIA, IIIB, IVA and IVB of the periodic table which acidic component has an activity index of at least 25 and (2) a porous support characterized by an activity index of less than 20 and having deposited thereon between about 0.05 and about 10 percent by weight of platinum metal and constituting between about .1 and about .9 weight fraction of said mixture.

References Cited in the file of this patent

UNITED STATES PATENTS

| | | |
|---|---|---|
| 2,372,165 | Arveson | Mar. 20, 1945 |
| 2,703,308 | Oblad et al. | Mar. 1, 1955 |
| 2,854,401 | Weisz | Sept. 30, 1958 |